Feb. 10, 1931.  W. DIETER  1,791,755
GYROSCOPIC STEERING MECHANISM
Filed April 16, 1926  2 Sheets-Sheet 1
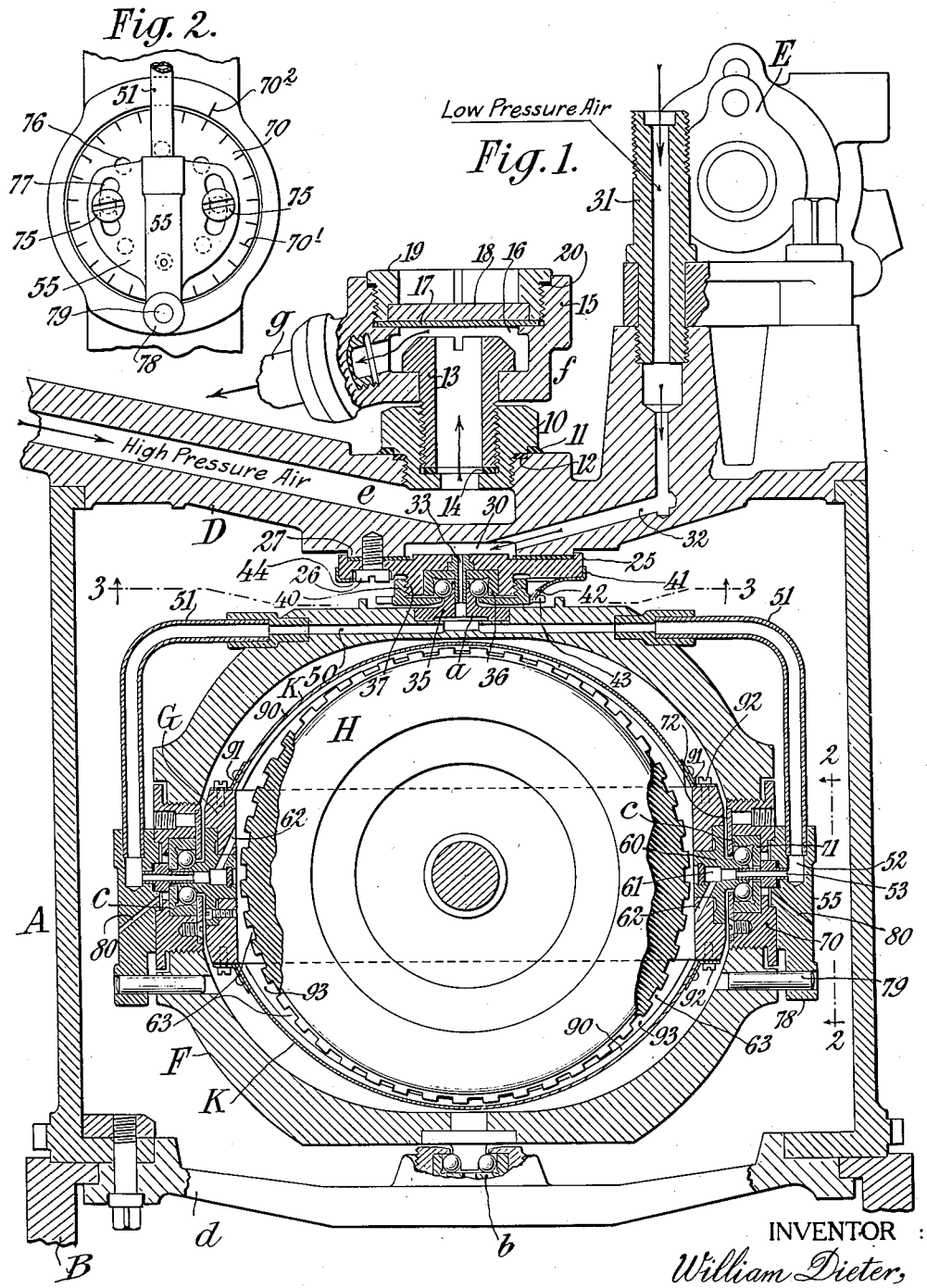
INVENTOR:
William Dieter,
By Attorneys,
Fraser, Myers & Manley Feb. 10, 1931.    W. DIETER    1,791,755
GYROSCOPIC STEERING MECHANISM
Filed April 16, 1926    2 Sheets-Sheet 2

INVENTOR:
William Dieter,
By Attorneys,
Fraser, Myers & Manley

Patented Feb. 10, 1931

1,791,755

UNITED STATES PATENT OFFICE

WILLIAM DIETER, OF NEWARK, NEW JERSEY, ASSIGNOR TO E. W. BLISS COMPANY, OF BROOKLYN, NEW YORK, A CORPORATION OF DELAWARE

GYROSCOPIC STEERING MECHANISM

Application filed April 16, 1926. Serial No. 102,429.

This invention relates to gyroscopes for controlling steering mechanisms such as are used for steering automobile torpedoes. In such mechanisms the gyroscope is commonly spun up by the action of compressed air upon a turbine. Within recent years provision has also been made for continuing the spin of the gyroscope to keep it at suitably high speed, by applying jets of air impinging upon the serrated periphery of the fly-wheel.

According to my Patent No. 1,322,232, dated November 18, 1919, the gyroscope is spun up by high pressure air taken directly from the compressed air flask, and during its run is maintained in rotation at the proper speed by low pressure air taken from the reduced pressure side of the usual pressure-reducing valve. According to my Patent No. 1,318,980, dated October 14, 1919, the low pressure air for the latter purpose is taken from the exhaust of either or both the servomotors or steering engines. My Patent No. 1,440,822, dated January 22, 1923, sets forth means whereby this secondary or low-pressure air for maintaining the spin at proper speed is introduced through the lower of the two bearings on which the outer gimbal ring is hung, is conducted through ducts formed within such outer gimbal ring to the bearings on which the inner gimbal ring is hung within the outer one, and is directed through these bearings to nozzles within such inner gimbal ring from which the air jets impinge upon the toothed periphery of the fly-wheel.

In the actual construction of the Bliss-Leavitt torpedoes as recently built, the low-pressure air has been introduced to the outer gimbal ring at its upper bearing instead of its lower bearing,—a change which involves some simplification of the construction. Some difficulties, however, have been encountered by reason of the leakage of the low-pressure air from such bearing, the air thus leaking impinging upon the outer ring and causing a precessional disturbance of the gyroscope. An object of the present invention is to avoid such leakages. Other objects of the invention will be made clear as the description proceeds.

The accompanying drawings illustrate the preferred embodiment of the invention.

Figure 1 is a vertical section corresponding generally to Fig. 1 in my said Patent No. 1,440,822. The section is taken through the high pressure and low pressure air admission conduits within the upper cap or stationary head of the gyroscope casing, and through the low pressure conduits within the outer gimbal ring, the several ball bearings traversed by the low pressure air being in section.

Fig. 2 is a fragmentary view looking from the right in Fig. 1, as indicated by the arrows on the line 2—2 in that figure.

Fig. 5 is an inverted plan of the ball-retaining cap of the bearing shown in Fig. 3, of which

Figure 3:
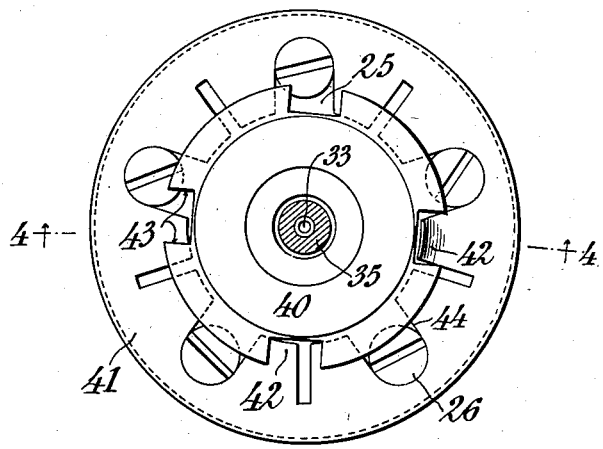
Fig. 3 is a underneath plan of the upper bearing for the outer gimbal ring.

Referring to the drawings, A is the usual gyro cup or casing, mounted as usual upon the base B which is fastened within the torpedo shell C; on the top plate or head D of the gyro casing are mounted in the usual manner the motors for vertical and horizontal steering, one of these steering engines being shown at E. Within the casing A is the gyroscope (commonly called gyro) comprising the usual outer gimbal ring F, inner gimbal ring G, and fly-wheel H. The outer gimbal ring is hung within the casing on a vertical axis on bearings $a$ and $b$, and the inner ring is hung within the outer one in bearings c, c, all in substantially the usual manner. The upper bearing a has its fixed member fastened directly beneath the head D, while the lower bearing b is supported on a lower head or spider d, as usual. These four bearings are best made as ball bearings, as is customary.

Figure 7:
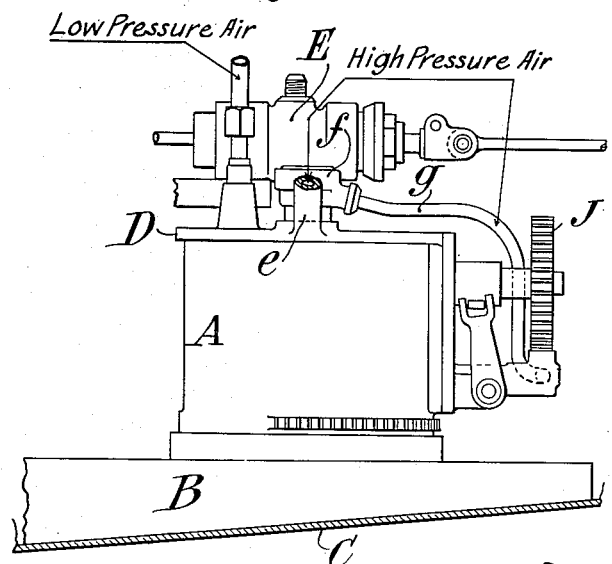
Fig. 7 is an elevation on a reduced scale, showing the general construction and arrangement of the gyro cup or casing and the depth engine, a portion of the torpedo shell beneath being shown in section.

For the initial spinning up of the gyroscope, high-pressure air taken from the compressed air flask is introduced by a conduit e shown as formed in the head D, and which communicates through a swivel connection f with an outside pipe g leading (see Fig. 7) to the nozzle of the spinning-up turbine J. This spinning-up construction is that which is well-known in the Bliss-Leavitt torpedo, and is shown in my Patent No. 1,153,678, dated September 14, 1915, and the patent of F. M. Leavitt, No. 1,185,210, dated May 30, 1916. The present invention has no reference to this initial spinning means. The construction is such that for an angle-fire the gyro casing A may be turned to the desired angle (the head D remaining stationary), and by the turning of the swivel f proper communication is maintained for the high pressure air from the inlet conduit e to the outlet pipe g, as is well understood.

In the construction of the swivel connection f difficulty has been experienced in maintaining proper packings for the high pressure air (its pressure approximating 3000 pounds per square inch) at this joint. Into the stationary head D is screwed a plug 10 sealed by packing gaskets at 11, 12, and into this plug 10 is screwed a tubular swivel spindle 13 packed by a gasket 14. A rotary shell 15 of the swivel f turns upon the swivel spindle 13, the head of the latter coming within a chamber 16 formed in this turning member. The top of this chamber is closed by an internal disk 17 backed by an outer strengthening disk 18, and this is held in place by a screw ring 19 which is packed by a gasket 20. To withstand the high pressure, these packing gaskets 11, 12 14 and 20 (and also advantageously the disk 17) should be of tinned copper, according to my Patent No. 1,478,108, dated December 18, 1923. By means of the construction just described, the high pressure swivel joint can be opened by simply unscrewing the ring or plug 19 carrying with it the disk 18 and permitting the disk 17 to be taken out, thereby giving access to the chamber 16. To disconnect the swivel, the tubular spindle 13 may be unscrewed and lifted out. With the packing means described the only possible leakage would be from the chamber 16 under the head of the swivel spindle 13 and around the neck of the latter. Any tendency to leakage here is practically overcome by the preponderant upward pressure of the compressed air on the swivel shell 15.

Figure 5:
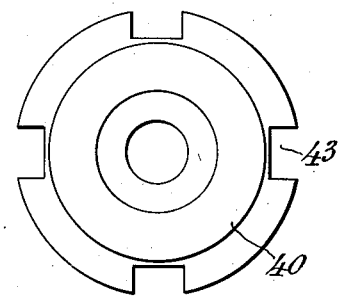
Figure 4:
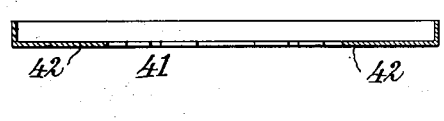
Fig. 4 is a transverse section of a spring washer on the line 4—4 in Fig. 3.
Figure 6:
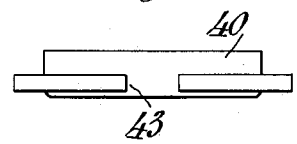
Fig. 6 is a side elevation.

The improved construction of the bearing a will now be described. The base of this bearing is a plate 25 (Figs. 1 and 3) which is fastened by screws 26 against the flat underface of the head D, a gasket 27 being interposed to make a tight joint. Within the gasket the head is hollowed to form a chamber 30 which receives low pressure air from a nipple 31 and communicating duct 32, the air flowing as indicated by the arrows. From the chamber 30 the low pressure air flows through a central nozzle 33 which telescopes into a bore in the bearing cone 35, so as to discharge the stream of air well into this cone; the surfaces of the nozzle and cone are a sufficiently loose fit to avoid friction. The bearing base 25 has a central socket in which is seated the ball race 36, and surrounding this is an annular threaded boss 37 on which screws the ball-retaining cap 40 (Figs. 5 and 6) which serves to cover the under-side of the ball cavity and hold the balls in place. This ball retainer requires very accurate adjustment in order that the balls may be confined closely enough to keep the cone properly centered and out of frictional contact with the central nozzle 33, while at the same time leaving the balls perfectly free to roll without friction. This adjustment is made by screwing the ball-retaining cap 40 up or down on the threaded boss 37. When correctly adjusted, it is desirable that it be held against turning, whereby the adjustment would be impaired. To thus hold the adjustment of the retainer a lock washer is provided consisting of a disk 41 of resilient sheet-metal preferably exteriorly flanged to embrace the base 25, and being radially slitted to form inwardly-directed tongues 42 which tend to spring downwardly, and in so doing, one or another of these tongues may enter one or another of a series of notches 43 formed peripherally in the retainer 40. The number and spacing of the spring tongues differ from the number and spacing of the notches 43, so that in any position of the retainer only one tongue will enter one of its notches, thus giving by a vernier-like arrangement of these coacting parts a great variety of rotary positions of the retainer in which it may be separately locked by the individual spring tongues. To adjust it, it is only necessary to push back the tongue which holds it and then turn it as may be desired, whereupon one of the other tongues will engage one of its other notches to again lock it. The spring lock washer 41 is itself prevented from turning by having notches 44 which receive the heads of the screws 26. The stress of the spring tongues pressing downwardly on the flange of the retainer exerts an upward push on the body of the lock washer such as holds it up firmly seated against the under-face of the bearing base 25.

As such ball bearings for the outer gimbal ring have been heretofore constructed, there has been opportunity for the escape of the compressed air (the pressure of which approximates 140 pounds per square inch) from a space or chamber corresponding to the chamber 30 outwardly between screw-threaded engaging parts which cannot be luted by any suitable packing, so that the air may leak around between the screw-threads and blow out from the screw joint in jets which impinge against the gimbal rings; any such impingement of air jets is liable to be unsymmetrical and to therefore exert a precessional effect upon the gimbal tending to deflect the gyroscope and thereby to impair its accuracy as a steering agent. The construction of bearing $a$ as just described avoids the possibility of any such leakage of air from the chamber 30, or of air flowing from this chamber into the continuing duct in the gimbal ring, except for the inevitable possibility of a slight leakage by back-flow through the extremely narrow annular clearance between the nozzle 33 and the cone 35.

The air entering through the nozzle 33 and cone 35 enters, as usual heretofore, into a duct 50 which is conveniently formed within the body of the outer gimbal ring or partly within such ring and partly by means of tubes 51 exterior thereto, the latter being the preferable construction. The air is thus led to the two inner gimbal ring bearings $c, c$, as will now be described.

The two bearings $c$ are exact counterparts, and a description of one will suffice for both. The tube 51 is soldered or otherwise united to a plate 55 having within it a chamber 52 forming a continuation of the air passage, and from this the air flows through an inner nozzle 53 (similar to the nozzle 33) which discharges into the bore of a cone member 60, which member is seated in the ring G. The cone member 60 has within it a cavity 61 which receives the air, and from which leads off obliquely a duct 62 formed partly in the cone member and partly in the body of the ring G, and which constitutes the discharge nozzle from which the jet of air is caused to impinge upon the teeth or buckets 63 which are fashioned on the surface of the fly-wheel H, whereby the fly-wheel is caused to act as a turbine under the impingement of the jets from the two oblique nozzles 62 on diametrically opposite sides of the fly-wheel. The ball bearing is constructed with a bearing base 70 which is externally threaded and screws into a threaded socket in the outer gimbal F. Within it is socketed the usual ball race 71, the open side of which is partly closed by a ball retainer consisting of a flat washer 72 fastened by small screws against the inner face of the base 70. For adjusting the two bearing cones on diametrically opposite sides of the ring G, it is essential to be able to move the ball race and balls of each bearing toward or from the center or axis of the fly-wheel. For this purpose the bearing base 70 is made bodily adjustable by screwing it in or out on its threaded engagement with the ring F. To maintain such adjustment it is requisite that this base be made fast in any adjusted position to which it is turned. For this purpose the base 70 is clamped fast by set screws 75 (see Fig. 2) which screw into threaded holes 76 in the base, and their heads are clamped tight against the plate 55 which has arc-shaped slots 77 which permit, when the screws 75 are slacked, of turning the base 70 for the purpose of such adjustment; this turning is limited by the length of the slots 77, but if a further adjustment is desired, the screws are withdrawn from the threaded holes in which they are engaged, and screwed into the next holes in advance, the length of the arc-shaped slots 77 being sufficient to at least bridge two such holes. To hold the plate 55 steady, so that it may effectively lock the base 70 against turning, the plate 55 has an extension formed as an ear 78 which fits over a pin 79 fixedly mounted in the ring F. Thus, in making a coarse adjustment the screws 75 are removed and the base turned to bring it to approximately the correct position, and upon completing the fine adjustment the screws 75 are threaded each into one of the holes 76 and then tightened against the plate 55.

It will be observed that the construction of each bearing $c$ is such that no leakage of air flowing from the duct 50, 52, is possible, except through the nozzle 53 into the chamber 61 and thence out through the jet nozzle 62 (except to the extent that a very slight leakage backwardly around the nozzle 53 is possible and cannot be avoided). Surrounding the flange or thickened part of this nozzle 53 is an annular chamber from which a diagonal vent 80 is provided which may discharge any air which may have leaked into this chamber from the cone and between the ball race and the nozzle.

The construction of air ducts through ball bearings thus described effectually solves the problem of conducting the low pressure air to the jet nozzles, from which it impinges upon the fly-wheel to keep it spinning, without permitting any leakage of such air such as might possibly disturb the gyroscope.

The drawings show the teeth or buckets 63 on the fly-wheel enclosed within an annular housing K whereby to somewhat confine the air issuing from the oblique jets 62, so that this air is kept in rotation with the fly-wheel longer than would otherwise result. The housing K is constituted of two arc-shaped strips of thin sheet-metal having flanges 91 which are fastened to the upper and lower sides of the ring G by suitable screws 92. This construction enables the fly-wheel to be driven at higher speed, while leaving it accessible so that speed readings may be taken.

The present invention is susceptible of some degree of modification without departing from its essential features as set forth in the subjoined claims.

I claim as my invention:

1. In a gyroscope having a stationary mounting for its outer gimbal ring and a ball bearing between said ring and mounting and having air-pressure means for maintaining its spin, comprising a bearing base fastened to such mounting to form an air chamber between said base and mounting, to which chamber air is admitted, a ball race and a cone with a nozzle centering in said base and ball race and projecting within a central bore in the cone to conduct air from said chamber through the cone into a continuing duct in said outer ring, and said bearing base formed as a plate intercepting any leakage of air from said chamber into impingement against said outer ring.

2. In a gyroscope having a stationary mounting for the outer gimbal ring and a ball bearing between said ring and mounting and having air-pressure means for maintaining its spin, comprising a bearing base fastened to such mounting to form an air chamber between said base and mounting, to which chamber air is admitted, a ball race, a cone attached to its outer gimbal ring and having a central bore, and a nozzle centered in said base and conducting compressed air from said chamber through the bore in said cone into a continuing duct in said outer ring, and a ball retainer applied to said bearing base and adjustable thereon, with means for holding said retainer in position after adjustment.

3. A gyroscope bearing according to claim 1, the stationary mounting for the outer gimbal ring formed with separate passages for high-pressure air and for low-pressure air, the metal between said passages being imperforate to prevent possible leakage of high pressure air into the low-pressure air passage.

4. A gyroscope bearing according to claim 1, the joint between the mounting and bearing base being in a horizontal plane remote from the top of the outer gimbal ring, whereby in the event of leakage from said joint any emerging air is directed away from the gimbal ring to avoid affecting the gyroscope.

5. A gyroscope bearing according to claim 2, said ball retainer having a threaded connection with the bearing base and having notches, and said retaining means comprising a spring washer having tongues differently spaced from said notches, whereby in each adjustment one of said tongues may engage one of said notches.

6. A gyroscope bearing according to claim 2, said bearing base united by screws to said mounting, and said ball retainer having a threaded connection with the bearing base and having notches, and said retaining means having notches engaging said screws for preventing its rotation, and having tongues one or another of which may enter one of the notches of said ball retainer.

In witness whereof, I have hereunto signed my name.

WILLIAM DIETER.